(12) United States Patent
Nino et al.

(10) Patent No.: US 10,220,477 B2
(45) Date of Patent: Mar. 5, 2019

(54) SLIDING LOCKING CONNECTOR

(71) Applicant: ECA Medical Instruments, Newbury Park, CA (US)

(72) Inventors: John Nino, Simi Valley, CA (US); David Ivinson, Camarillo, CA (US)

(73) Assignee: ECA Medical Instruments, Thousand Oaks, CA (US)

( * ) Notice: Subject to any disclaimer, the term of this patent is extended or adjusted under 35 U.S.C. 154(b) by 0 days.

(21) Appl. No.: 15/867,468

(22) Filed: Jan. 10, 2018

(65) Prior Publication Data
US 2018/0126540 A1 May 10, 2018

Related U.S. Application Data

(63) Continuation of application No. 14/970,324, filed on Dec. 15, 2015, now Pat. No. 9,895,796, which is a continuation of application No. PCT/US2014/043249, filed on Jun. 19, 2014.

(60) Provisional application No. 61/836,755, filed on Jun. 19, 2013.

(51) Int. Cl.
B23P 19/04 (2006.01)
B23B 31/107 (2006.01)
B25G 3/26 (2006.01)
B25B 23/00 (2006.01)
B25G 3/18 (2006.01)

(52) U.S. Cl.
CPC .......... B23P 19/04 (2013.01); B23B 31/1074 (2013.01); B25B 23/0035 (2013.01); B25G 3/18 (2013.01); B25G 3/26 (2013.01); *B23B 2231/46* (2013.01); *Y10S 279/904* (2013.01); *Y10T 279/17811* (2015.01)

(58) Field of Classification Search
CPC . B23P 19/04; B23B 31/1074; B23B 2231/46; B25G 3/26; Y10T 279/17786; Y10T 279/17794; Y10T 279/17811; Y10S 279/904
See application file for complete search history.

(56) References Cited

U.S. PATENT DOCUMENTS

| | | |
|---|---|---|
| 691,449 A | 1/1902 | Craig |
| 887,116 A | 5/1908 | Palmer |
| 943,863 A | 12/1909 | Clouse |
| 2,395,534 A | 2/1946 | Cook |

(Continued)

FOREIGN PATENT DOCUMENTS

JP 2002-096273 A 4/2002

OTHER PUBLICATIONS

International Search Report dated Oct. 10, 2014, issued in International Patent Application PCT/US2014/043249 filed Jun. 19, 2014.

*Primary Examiner* — Eric A Gates
(74) *Attorney, Agent, or Firm* — Baker & Hostetler LLP; Mark H. Krietzman

(57) ABSTRACT

A sliding sleeve or collar which is cylindrical and has an elongated guide or channel fluidly connecting the outer annular wall with the inner annular wall of the sleeve is disclosed. A connector having at least one open end and an elongated slot with a floor and a pin guide through the floor is further disclosed. The pin guide is open to the inside of the connector. Between the sleeve and the slot is a pin having a pin head visible through the elongated guide and two opposing spring arms of a size and shape to fit in said slot, and a pin body which movable fits inside pin guide.

8 Claims, 4 Drawing Sheets

(56) References Cited

U.S. PATENT DOCUMENTS

| | | | |
|---|---|---|---|
| 2,596,594 A | 5/1952 | Petre | |
| 3,123,370 A | 3/1964 | Unander | |
| 4,858,939 A | 8/1989 | Riggs | |
| 5,779,404 A | 7/1998 | Jore | |
| 6,863,280 B2 | 3/2005 | Chiu | |
| 7,306,396 B1 | 12/2007 | Chien | |
| 7,866,235 B2 | 1/2011 | Hi | |
| 7,871,080 B2 | 1/2011 | Marini et al. | |
| 8,262,097 B2 | 9/2012 | Lai | |
| 8,308,168 B2 | 11/2012 | Nash | |
| 8,366,120 B2 | 2/2013 | Hu | |
| 8,366,121 B2 | 2/2013 | Hu | |
| 9,629,640 B2 | 4/2017 | Stern | |
| 2006/0048613 A1 | 3/2006 | Abel et al. | |
| 2007/0204730 A1 | 9/2007 | Rajotte | |
| 2012/0055296 A1 | 3/2012 | Landowski | |

SLIDING LOCKING CONNECTOR

CROSS-REFERENCE TO RELATED APPLICATIONS

This application is a Continuation of U.S. Utility patent application Ser. No. 14/970,324, filed Dec. 15, 2015, which is a Continuation of International Patent Application PCT/US2014/043249, filed Jun. 19, 2014, which claims priority to U.S. Provisional Patent Application 61/836,755, filed Jun. 19, 2013, the disclosures of which are hereby incorporated by reference in their entirety.

FIELD OF THE DISCLOSURE

The present disclosure relates to a slideable locking tool connector.

BACKGROUND

Tools such as screwdrivers, drills and socket wrenches have traditionally provided a mounting means to replace or swap out a shaft or a shaft with a tool on a remote end (i.e., a screwdriver or hex wrench).

Pressure fits, locking collars and moving ball bearings have all been used to hold or latch a shaft to a handle or device.

SUMMARY

Disclosed herein is a connection system, method and device whereby a sliding cylindrical sleeve or collar having an elongated guide or channel fluidly connecting the outer annular wall with the inner annular wall of the sleeve fits over a connector having at least one open end and an elongated slot with a floor and a pin guide through the floor. The pin guide is open to the inside of the connector. Between the sleeve and the slot is a pin having a pin head visible through the elongated guide and two opposing soring arms of a size and shape to fit in said slot and a pin body which movable fits inside pin guide. Sliding the sleeve along the connector connects or disconnects a tool via a retention fixture. The pin body is urged downward into the retention fixture when the sleeve compresses one or more of the spring arms. Sliding the sleeve in an opposite direction decompresses the spring arms and the pin body will move upward back into the pin guide.

According to aspects of one or more exemplary implementations, disclosed is a locking tool-mounting connector, with at least a connector having an open end, a slot, and a pin guide extending into the open end; a slideable sleeve having pin catch guide; a movable pin, having a pin head, curved spring arms extending therefrom, said spring arms being opposite one another on the pin; and a pin body. In some instances, the spring arms are asymmetrical, with one arm above the other arm. In some instances, the pin body also has a curved distal end.

According to aspects of one or more exemplary implementations, disclosed is a locking tool-mounting connector having an elongated connector with an open end forming a tool guide, a slot and a pin guide extending into the open end; a slideable sleeve having pin catch guide; a movable pin assembly having a pin head, a first curved spring arm and a second curved spring arm extending therefrom, a pin body having a distal end; and, wherein the arms are asymmetrical, with one arm above the other arm. In some instances, the pin catch is ovoid with a fluidly connected first catch region and second catch region. In some instances, a lock latch may be interposed between the two fluidly connected regions.

According to aspects of one or more exemplary implementations, disclosed is a locking tool-mounting connector having an elongated connector with an open end forming a tool guide, a slot and a pin guide extending into the open end; a slideable sleeve having pin catch guide; a movable pin assembly having a pin head, a first curved spring arm and a second curved spring arm extending therefrom, a pin body having a distal end; wherein the arms are asymmetrical, with one arm above the other arm and the pin body sits movably in the pin guide. In some instances, the connector includes a tool shaft with retention fixture inserted into the tool guide.

In the above examples the pin head can act as a catch extended above the spring arms and is of a size and shape to pass through the lock latch by temporarily displacing it, whereby sleeve movement is restricted; the distal end of the pin may be curved.

According to aspects of one or more exemplary implementations, disclosed are methods of reversibly affixing a shaft to a connector by placing a pin of a pin assembly in a guide within an elongated connector; then sliding a sleeve having pin catch guide over the pin assembly and the elongated connector whereby the pin head is visible through the pin catch; then inserting a tool shaft with a retention fixture into the open end of the elongated connector; and, moving the sleeve along the connector, whereby the slideable sleeve compresses the two spring arms of the pin assembly and urges the distal end of the pin through the guide into the retention fixture. In some instances, the pin catch is ovoid having a fluidly connected first catch region and second catch region.

According to aspects of one or more exemplary implementations, disclosed are methods of reversibly affixing a shaft to a connector by placing a pin of a pin assembly in a guide within an elongated connector; then sliding a sleeve having pin catch guide over the pin assembly and the elongated connector whereby the pin head is visible through the pin catch; then inserting a tool shaft with a retention fixture into the open end of the elongated connector; and, moving the sleeve along the connector, whereby the slideable sleeve compresses the two spring arms of the pin assembly and urges the distal end of the pin through the guide into the retention fixture. In some instances, the pin catch further comprises a lock latch in between the first catch region and the second catch region. In some instances, the pin head is a catch which extends into the pin catch and is a size and shape to pass through the lock latch by temporarily displacing it.

According to aspects of one or more exemplary implementations, disclosed are methods of reversibly affixing a shaft to a connector by placing a pin of a pin assembly in a guide within an elongated connector; then sliding a sleeve having pin catch guide over the pin assembly and the elongated connector whereby the pin head is visible through the pin catch; then inserting a tool shaft with a retention fixture into the open end of the elongated connector; and, moving the sleeve along the connector whereby the slideable sleeve compresses the two spring arms formed opposite one another on the pin body of the pin assembly and urges the distal end of the pin through the guide into the retention fixture.

In the above exemplars the spring arms may be asymmetrical and the one spring arm nearer to the pin head, when compressed, will urge the distal end of the pin into the retention fixture. The other spring arm whereby the spring arm further from the pin head, when compressed, will not urge the distal end of the pin into the retention fixture.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
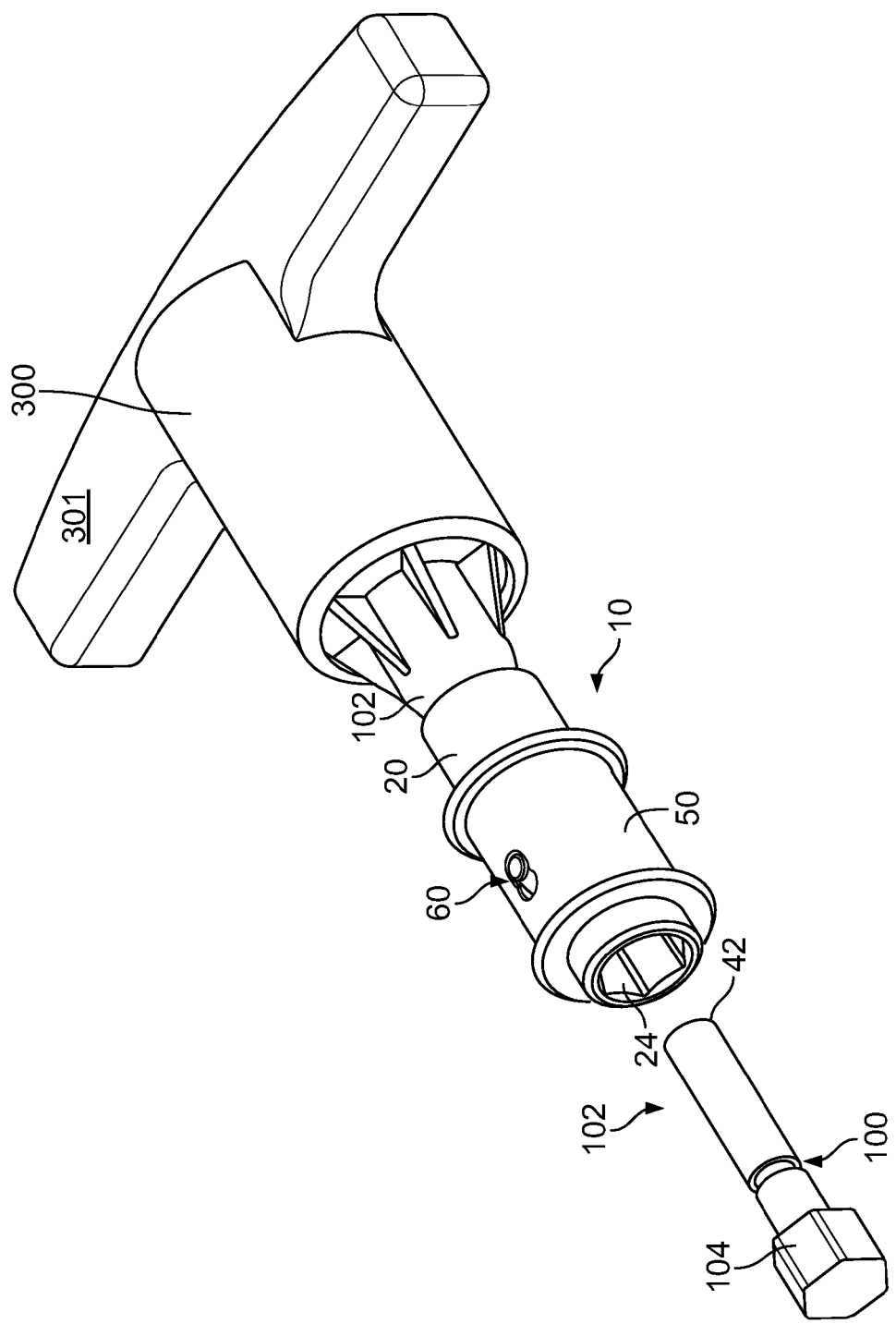
FIG. 1 shows an assembly view of a hand tool with a slide lock mount.
Figure 2:
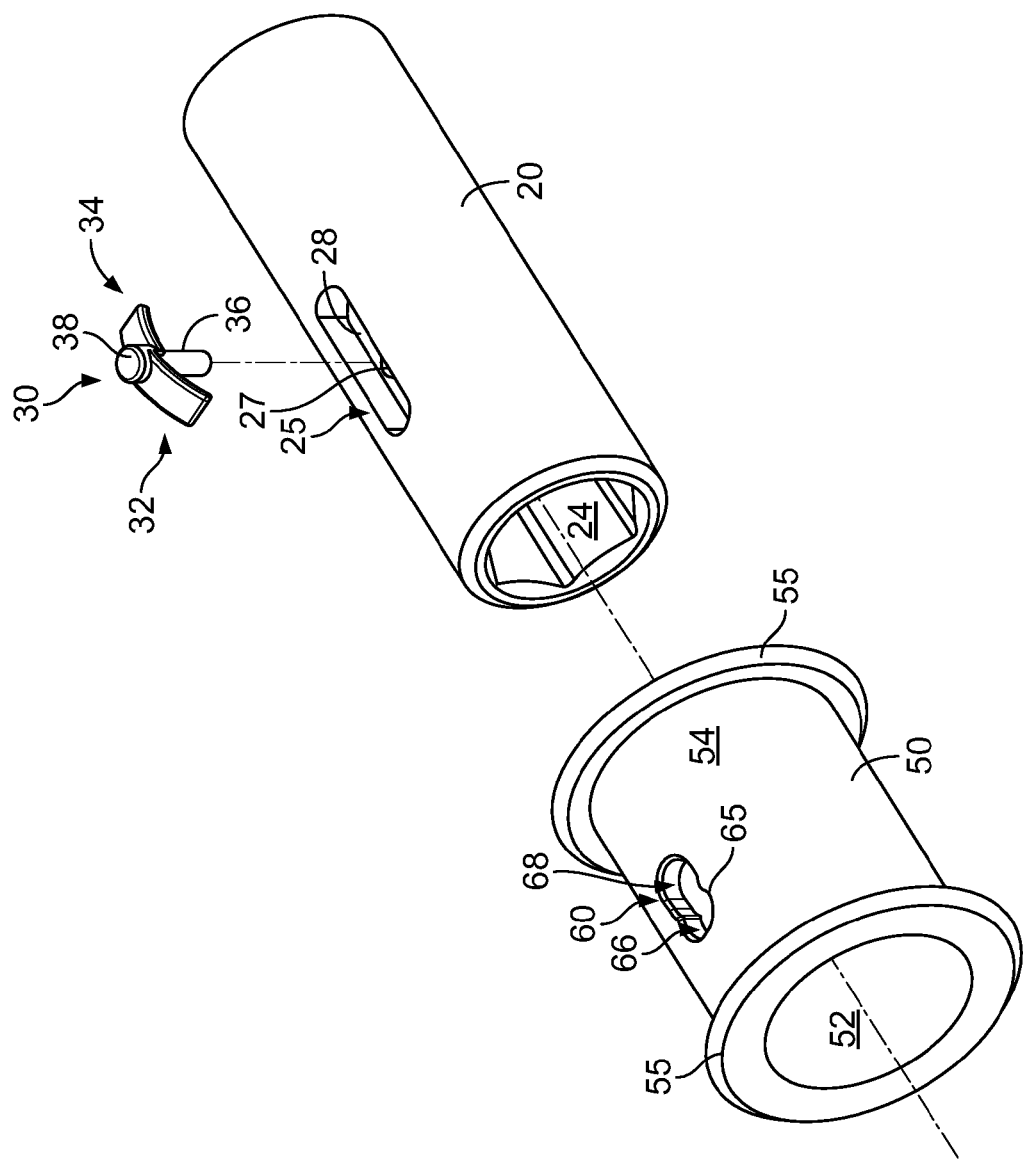
FIG. 2 shows an assembly view of a slide lock mount.

While the specification concludes with claims defining the features of the present disclosure that are regarded as novel, it is believed that the present disclosure's teachings will be better understood from a consideration of the following description in conjunction with the appendices, figures, in which like reference numerals are carried forward. All descriptions and callouts in the Figures are hereby incorporated by this reference as if fully set forth herein.

According to one or more exemplary implementations, as shown in FIGS. 1-5B, a device 10, which may be hand held, provides a platform for one or more sliding tool lock mounting devices, methods, systems and aspects thereof.

An elongated connector 20 (also referred to an arm or leg) has a closed end 22 and an open end 24. Formed axially on the connector is a slot 25 and within the slot is a pin guide 27. A latching spring assembly 30, with opposing first and second spring arms 32 and 34 and a pin body 36, is fitted into the slot. The pin body 36 sits in the pin guide 27 wherein it may move up and down, including extending into the open tool guide 26, the tool guide and pin guide being fluidly connected to the open end 24. The spring arms rest in the slot 25. The spring arms may be asymmetrical whereby the first spring arm 32 is further from the pin body 36 then the distal end of the pin 37 then the second spring arm 34. The distal end of the pin 37 may be curved. In other instances, the spring arms may be symmetrical. At the proximal end of the pin is a locking pin head 38 that extends above the spring arms and can act as a catch. The distal end of the pin 37 may be curved (concave) to facilitate entry and removal from a retention fixture 100 such as that formed in a tool shaft 102 which may support a tool 104.

The first spring arm 32 further comprises a curved member 200 affixed by its proximal end 201 to the pin, whereby the distal end 202 is unattached or free and below the proximal end and near to the distal end of the pin 37. The second spring arm 34 further comprises a curved member 210 affixed by its proximal end 211 to the pin whereby the distal end 212 is unattached or free and below the proximal end and near to the distal end of the pin 37. Both distal ends of the spring arms rest against the floor 28 of the slot 25. In a hand held tool, the connector is attached to a tool body 300, which may be a fixed tool or a torque limiting device within the body. The body may have handles 301 affixed to or formed as part thereof.

A slideable open cylindrical sleeve 50 with an internal annular wall 52 and an external annular wall 54 and at rim 55 at each end is shown. An elongated opening fluidly connects the external annular wall 54 and the internal annular wall 52 thereby forming a pin catch guide 60, which may be locking. At the first end 62 of the locking catch guide is a region larger than the pin head 38 wherein the pin head can move freely. At the second end 64 is a region larger than the pin head whereby the pin head can move freely. Between the first and second ends is a lock latch 65, which is an extension of the sleeve into the elongated opening, thereby pinching it off or otherwise forming a small narrow region, which has a smaller diameter as the pin head 38. For the pin head to be caught into a first catch region 66 or a second catch region 68, the pin head must temporarily displace the lock latch 65, which is a material thin enough and flexible enough to be displaced by said pin head 68. The catching of the pin head 38 in the first region or second region via the lock latch restricts free movement of the sleeve. A force must be applied to the sleeve to displace the lock latch and push it past the pin head, the first catch region 66 and the second catch region 68 are fluidly connected with the lock latch creating a reduced diameter passageway.

The proximal end 201 of the first spring arm is closer to the pin head 38 than the proximal end 211 of the second spring arm. The offset arrangement provides asymmetry to the locking features herein by having the compression of the higher spring arm (closer to the pin head) correspond to extending the pin body 36 further into the open tool guide 26. The asymmetry of the arms within the elongated pin catch guide 60 provides for movement of the sleeve in one direction to be locking, and movement in another direction to be releasing. The arms within the slot 25 hold the asymmetry in one orientation and prevent rotation.

Figure 3A:
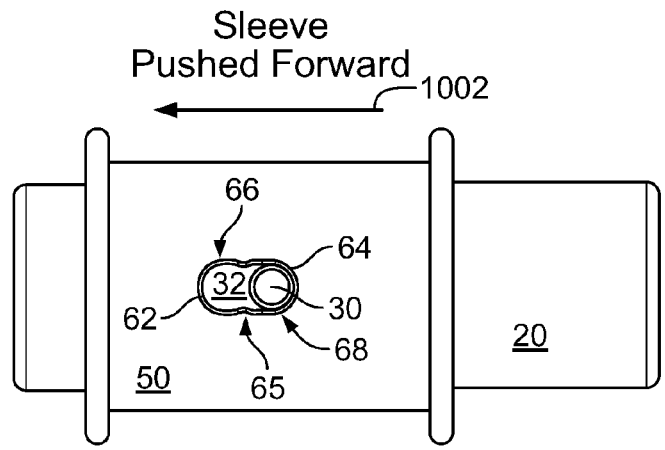
FIGS. 3A and 3B show a top view and a cut-away side view of a pin to sleeve open slide lock mount.
Figure 3B:
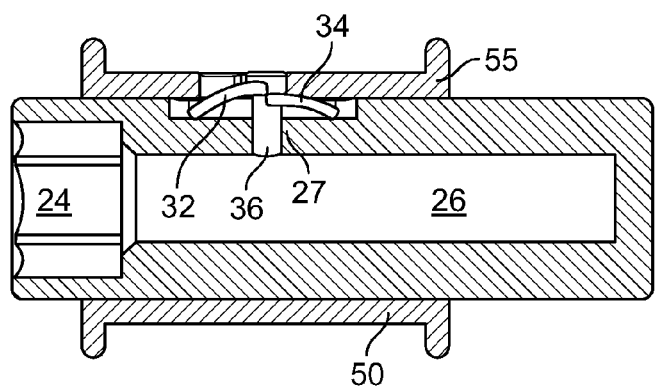
Figure 4:
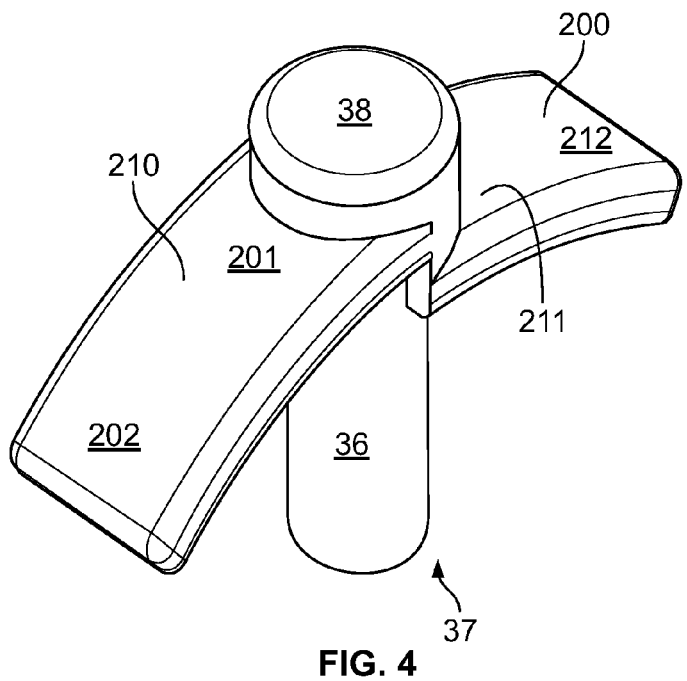
FIG. 4 shows an asymmetrical retaining pin.
Figure 5A:
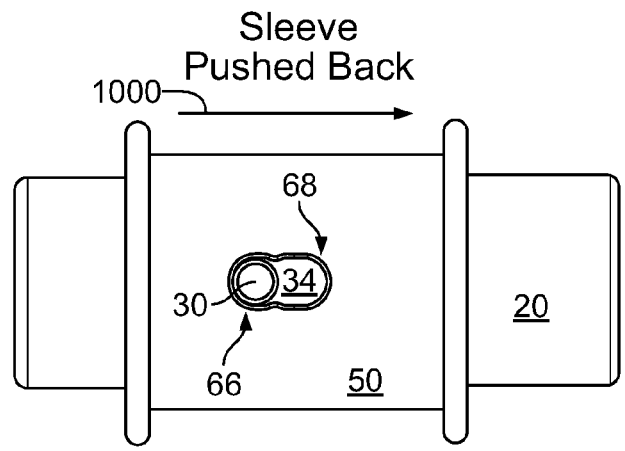
FIGS. 5A and 5B show a top view and a cut-away side view of a pin to sleeve closed slide lock mount.

As shown in FIGS. 3A, 3B and 5A when the pin head 38 is in the second catch region 68, the second spring arm 34 is compressed from its proximal end 211 and a less than maximum displacement of the pin body 36 is achieved, thereby the pin body 36 is not extended into the open tool guide 26.

Figure 5B:
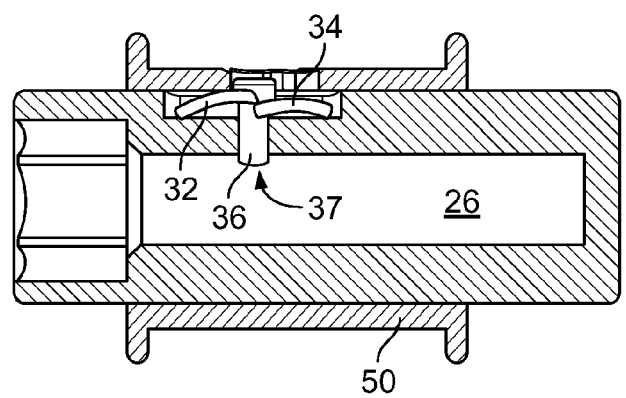

As shown in FIGS. 3A, 5A and 5B when the pin head 38 is in the first catch region 66, the first spring arm 32 is compressed from its proximal end 201 and the maximum displacement of the pin body 36 is achieved, thereby extending it into the open tool guide 26, whereby it is mated with a retention fixture 100.

Methods of locking and unlocking a pin body 36 into the retention fixture 100 are disclosed herein. A pin 30 is placed in slot 25 in a connector 20. The pin body fits into a pin guide 27 and a slideable sleeve is slipped on to the connector and over the pin head 38, whereby the pin head 38 extends through the pin catch guide 60.

In a first position, the slideable sleeve is moved along the pathway of arrow 1000 and the pin head 38 displaces the lock latch 65 and rests in the first catch region 66 and the pin body 36 extends into the open tool guide 26. The internal annular wall of the sleeve 52 applies a force to the first spring arm 32 from the proximal end 201 downward and the distal end 202 is unable to move downward against the floor 28 of the slot 25. The sleeve movement over the arm provides sufficient force to compress the spring arm (allowing movement of the pin body). When a tool shaft 102 with retention fixture 100 is aligned with the open tool guide, the pin body 36 so displaced extends into the retention fixture 100, thereby fixing the tool shaft in place.

To remove a tool shaft affixed by the method disclosed herein, the sleeve 50 is slid along the direction of arrow 1002 and the pin head 38 again displaces the lock latch 65 and now rests in the second catch region 68. The movement places the first spring arm in the open lock latch 65, thereby allowing it to decompress and causing the pin body 36 to withdraw into the open tool guide 26; the second spring arm 34 also decompresses; and the pin body 36 is no longer displaced into the open tool guide 26 nor extended into a retention fixture 100. Accordingly, the tool can be removed.

Figure 6:
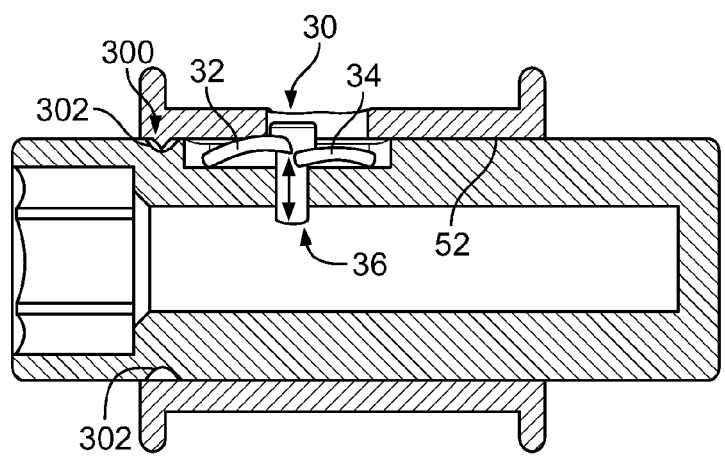
FIG. 6 shows a slide lock with sleeve to connector latch catch.

FIG. 6 shows another exemplar wherein an additional or alternative sleeve fixture 300 is illustrated. The sleeve fixture is an extended region or regions which are formed on the internal annular wall 52 and can fit into a sleeve latch 302 formed as an annular groove on the connector. In some instances, this combination of fixture 300 and latch 302 may be an additional fixing means, in other instances it may be used in lieu of the lock latch 65.

While the method and apparatus have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all references listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

What is claimed is:

1. A method of reversibly locking a tool-mounting connector, the method comprising:
    placing the distal end (37) of a movable pin assembly (30) having a pin body (36), a pin head (38) with an extended distal end, a first curved spring arm (32) and a second curved spring arm (34) extending therefrom into a pin guide (27) of an elongated connector (20);
    the elongated connector configured with an open end (24) forming a tool guide (26), a slot (25);
    sliding a moveable sleeve (50) having pin catch guide (60) onto the elongated connector;
    providing a lock latch (65) in between the first catch region and the second catch region wherein the two regions remain fluidly connected;
    wherein the pin head is a catch which extends above the spring arms and is a size and shape to pass through the lock latch only by temporarily displacing it whereby sleeve movement is restricted;
    wherein the pin catch guide is ovoid with a first catch region (66) and a second catch region (68) and,
    wherein the arms are asymmetrical, with one arm above the other arm.

2. The method of claim 1, the method further comprising placing a tool shaft (102) with retention fixture (100) inserted into the tool guide.

3. The method of claim 1, wherein the distal end of the pin (37) is curved.

4. The method of claim 1, the method further comprising forming one spring arm nearer to the pin head then the other spring arm whereby the spring arm near the pin head, when compressed, will urge the distal end of the pin into a retention fixture.

5. The pin connector of claim 4, wherein the arms are positioned opposite one another on the distal end.

6. The method of claim 1, the method further comprising forming one spring arm further from the pin head then the other spring arm whereby the spring arm further from the pin head, when compressed, will not urge the distal end of the pin into a retention fixture.

7. A method of reversibly locking a tool-mounting connector, the method comprising:

placing the distal end (37) of a movable pin assembly (30) having a pin body (36), a pin head (38) with an extended distal end, a first curved spring arm (32) and a second curved spring arm (34) extending therefrom into a pin guide (27) of an elongated connector (20);

the first spring arm further comprises:

a curved member (210) with a proximal end (201) and a distal end (202);

wherein the proximal end is affixed to the pin assembly;

wherein the distal end is unaffixed and oriented below the height of the proximal end on the pin assembly;

the elongated connector configured with an open end (24) forming a tool guide (26), a slot (25);

sliding a moveable sleeve (50) having pin catch guide (60) onto the elongated connector;

wherein the pin catch guide is ovoid with a first catch region (66) and a second catch region (68);

wherein the arms are asymmetrical, with one arm above the other arm; and, whereby the sleeve sliding over the curved member compresses the spring arm against the floor (28) of the slot thereby pushing the distal end of the pin into the open tool guide.

8. A method of reversibly locking a tool-mounting connector, the method comprising:

placing the distal end (37) of a movable pin assembly (30) having a pin body (36), a pin head (38) with an extended distal end, a first curved spring arm (32) and a second curved spring arm (34) extending therefrom into a pin guide (27) of an elongated connector (20);

the second spring arm further comprises:

a curved member (200) with a proximal end (211) and a distal end (212);

wherein the proximal end is affixed to the pin assembly;

wherein the distal end is unaffixed and oriented below the height of the proximal end on the pin assembly;

the elongated connector configured with an open end (24) forming a tool guide (26), a slot (25);

sliding a moveable sleeve (50) having pin catch guide (60) onto the elongated connector;

wherein the pin catch guide is ovoid with a first catch region (66) and a second catch region (68);

wherein the arms are asymmetrical, with one arm above the other arm; and, whereby the sleeve sliding over the curved member compresses the spring arm against the floor not pushing the distal end of the pin into the open tool guide.

* * * * *